(12) United States Patent
Song (10) Patent No.: US 8,767,384 B2
(45) Date of Patent: Jul. 1, 2014

(54) DISPLAY APPARATUS AND PORTABLE COMPUTER HAVING THE SAME

(75) Inventor: Young-Shin Song, Geonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 8 days.

(21) Appl. No.: 12/856,831

(22) Filed: Aug. 16, 2010

(65) Prior Publication Data

US 2011/0051348 A1  Mar. 3, 2011

(30) Foreign Application Priority Data

Aug. 25, 2009 (KR) ................. 10-2009-0078897

(51) Int. Cl.
*G06F 1/16* (2006.01)
*H05K 5/00* (2006.01)
*H05K 7/00* (2006.01)

(52) U.S. Cl.
USPC ................. 361/679.28; 361/679.26

(58) Field of Classification Search
USPC .............. 361/679.21–679.22, 679.26–679.3, 361/679.28; 348/837; 313/582; 349/56–60
See application file for complete search history.

(56) References Cited

U.S. PATENT DOCUMENTS

| | | | | |
|---|---|---|---|---|
| 4,298,204 | A * | 11/1981 | Jinkins | 277/641 |
| 5,268,816 | A * | 12/1993 | Abell et al. | 361/679.09 |
| 5,422,751 | A * | 6/1995 | Lewis et al. | 349/59 |
| 5,583,742 | A * | 12/1996 | Noda et al. | 361/679.21 |
| 6,373,537 | B2 * | 4/2002 | Yun et al. | 349/58 |
| 6,507,377 | B1 * | 1/2003 | Jung | 349/60 |
| 6,515,721 | B2 * | 2/2003 | Jin et al. | 349/58 |
| 6,542,206 | B1 * | 4/2003 | Saito | 349/58 |
| 6,618,240 | B1 * | 9/2003 | Kim | 361/679.07 |
| 6,871,138 | B1 * | 3/2005 | Minelli | 701/200 |
| 6,894,739 | B2 * | 5/2005 | Sung et al. | 349/58 |
| 6,919,937 | B2 * | 7/2005 | Kim et al. | 349/58 |
| 7,259,958 | B2 * | 8/2007 | Bang et al. | 361/679.27 |
| 7,312,984 | B2 * | 12/2007 | Richardson et al. | 361/679.41 |
| 7,457,120 | B2 * | 11/2008 | Bae et al. | 361/704 |
| 7,464,814 | B2 * | 12/2008 | Carnevali | 206/320 |
| 7,508,655 | B2 * | 3/2009 | Baek | 349/56 |
| 7,525,535 | B2 * | 4/2009 | Kim et al. | 345/169 |
| 7,692,732 | B2 * | 4/2010 | Tsubokura et al. | 349/58 |
| 7,733,642 | B2 * | 6/2010 | Liou et al. | 361/679.41 |
| 7,864,264 | B2 * | 1/2011 | Sato et al. | 349/60 |
| 7,885,059 | B2 * | 2/2011 | Kim et al. | 361/679.21 |
| 7,907,399 | B2 * | 3/2011 | Kim et al. | 361/679.55 |
| 7,936,416 | B2 * | 5/2011 | Huang et al. | 349/58 |
| 8,000,088 | B2 * | 8/2011 | Zhou et al. | 361/679.01 |
| 2001/0010569 | A1 * | 8/2001 | Jin et al. | 349/58 |
| 2002/0080298 | A1 * | 6/2002 | Fukayama | 349/58 |
| 2004/0004680 | A1 * | 1/2004 | Kim | 349/58 |
| 2004/0141101 | A1 * | 7/2004 | Osu et al. | 349/58 |
| 2006/0028790 | A1 * | 2/2006 | Baek | 361/681 |
| 2007/0188675 | A1 * | 8/2007 | Tsubokura et al. | 349/58 |
| 2007/0236465 | A1 * | 10/2007 | Chou et al. | 345/173 |
| 2007/0242182 | A1 * | 10/2007 | Hong et al. | 349/58 |
| 2008/0094786 | A1 * | 4/2008 | Liou et al. | 361/679 |
| 2009/0009944 | A1 * | 1/2009 | Yukawa et al. | 361/681 |
| 2009/0201439 | A1 * | 8/2009 | Eu et al. | 349/58 |

* cited by examiner

*Primary Examiner* — Adrian S Wilson (74) *Attorney, Agent, or Firm* — Cha & Reiter, LLC (57) ABSTRACT

A display apparatus includes a display module which forms an image, a window cover affixed to an upper side of the display module, a base cover affixed to a lower side of the display module and a middle member which is disposed between the display module and the base cover that includes both a module support unit for supporting the display module and a bezel unit arranged about a circumference of the module support unit for coupling with the window cover.

16 Claims, 6 Drawing Sheets

DISPLAY APPARATUS AND PORTABLE COMPUTER HAVING THE SAME

CLAIM OF PRIORITY

This application claims priority from Korean Patent Application No. 10-2009-0078897, filed on Aug. 25, 2009 in the Korean Intellectual Property Office, the disclosure of which is incorporated herein by reference.

BACKGROUND

1. Field of the Invention

Apparatuses consistent with the exemplary embodiments relate to a display apparatus and a portable computer having the same, and more particularly, to a display apparatus and a portable computer having the same improving an assembling configuration.

2. Description of the Related Art

In general, a display apparatus includes a display module for forming and presenting an image and a cover member for supporting the display module. Such a display apparatus is found in various electronic device arrangements, for example, a monitor, an electronic frame, a television, etc., and are found to be rotatably mounted within portable computers.

The display module of the display apparatus is generally found to comprise a display panel of a thin plate shape, e.g., a liquid crystal display (LCD), a plasma display panel (PDP), etc., and are more recently found to comprise a light emitting diode (LED) as a backlight to the LCD, the combination realizing a thinner and brighter module.

Such a known display apparatus reinforces a portable function, allowing users to operate them in various indoor and outdoor places and applications. Also, known display apparatus are configured to be waterproof for use in various environments such as a bathroom, etc., wherein moisture might easily permeate through if not assembled properly. But as is known, special assembly operations to form waterproofed display modules and apparatus presents production challenges and problems with commensurate manufacturing cost increases, etc.

SUMMARY OF THE INVENTION

Accordingly, the present invention provides a display apparatus and a portable computer having the same that overcomes the shortcomings of the prior art while improving user convenience, assembling efficiency, etc.

The foregoing and/or other aspects are achieved in a display apparatus including a display module for forming an image, a window cover affixed to an upper side of the display module, a base cover affixed to a lower side of the display module and a middle member disposed between the display module and the base cover that comprises a module support unit supporting the display module and a bezel unit arranged about circumference of the module support unit for coupling with the window cover.

The bezel unit and the window cover are coupled by an adhering member that displays a waterproof function.

In one form, the adhering member is a double sided tape or an adhesive.

The module support unit is preferably configured as a planar shape.

The bezel unit is arranged to protrude from the module support unit so that the display module can be attached or form fitted to the module support unit.

In another embodiment, the invention includes a portable computer having a computer main body and a display apparatus mounted on the computer main body to be rotatable about the computer main body.

The display apparatus includes a display module which forms an image, a window cover affixed to an upper side of the display module, a base cover affixed to a lower side of the display module and a middle member disposed between the display module and the base cover that comprises a module support unit supporting the display module and a bezel unit disposed about a circumference of the module support unit for coupling with the window cover.

The bezel unit and the window cover are coupled by an adhering member having a waterproof function.

The adhering member preferably comprises a double sided tape or an adhesive.

The module support unit is preferably configured as a planar shape.

The bezel unit is arranged to protrude from the module support unit so that the display module can coupled or form fitted to the module support unit.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE INVENTION

Below, exemplary embodiments of the invention will be described in detail with reference to accompanying drawings so as to be easily realized by a person having ordinary knowledge in the art. The embodiments are presented for exemplary purposes only, and are not meant to limit the invention in scope or spirit. Descriptions of well-known parts are omitted for clarity, and like reference numerals refer to like elements throughout.

Figure 1:
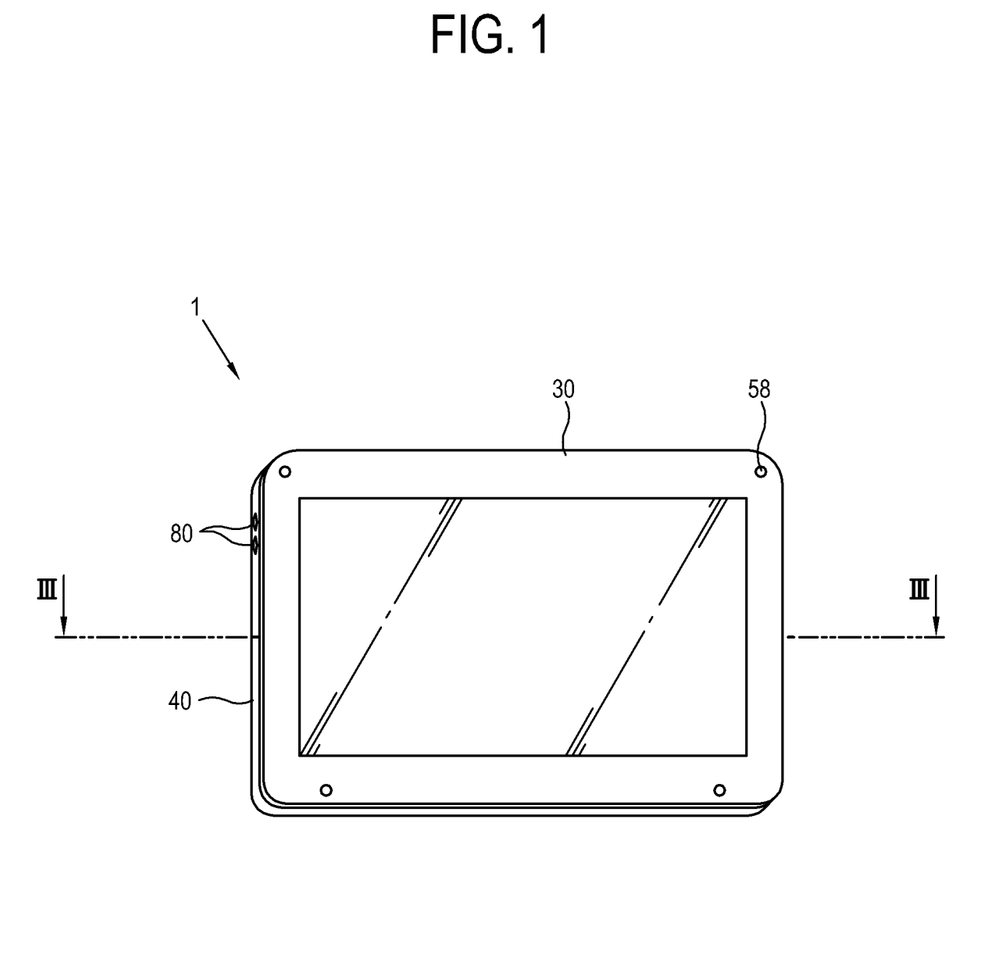
FIG. 1 is a perspective view of a display apparatus according to an exemplary embodiment.
Figure 2:
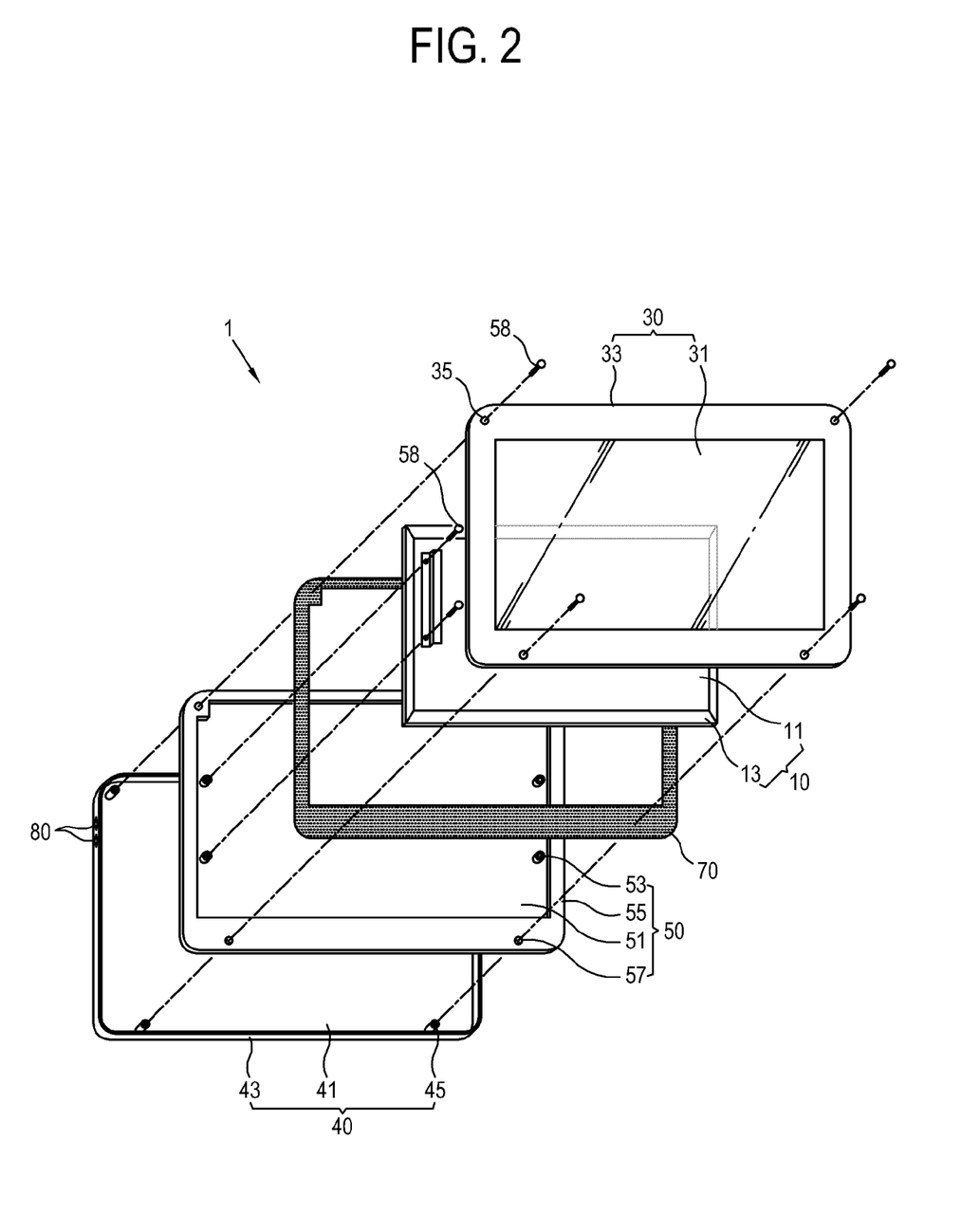
FIG. 2 is an exploded perspective view of the display apparatus of FIG. 1.

FIG. 1 is a perspective view of one embodiment of a display apparatus of the invention; FIG. 2 is an exploded perspective view of the display apparatus 1 of FIG. 1 and FIG. 3 is a sectional view of the FIG. 1 display apparatus.

Figure 3:
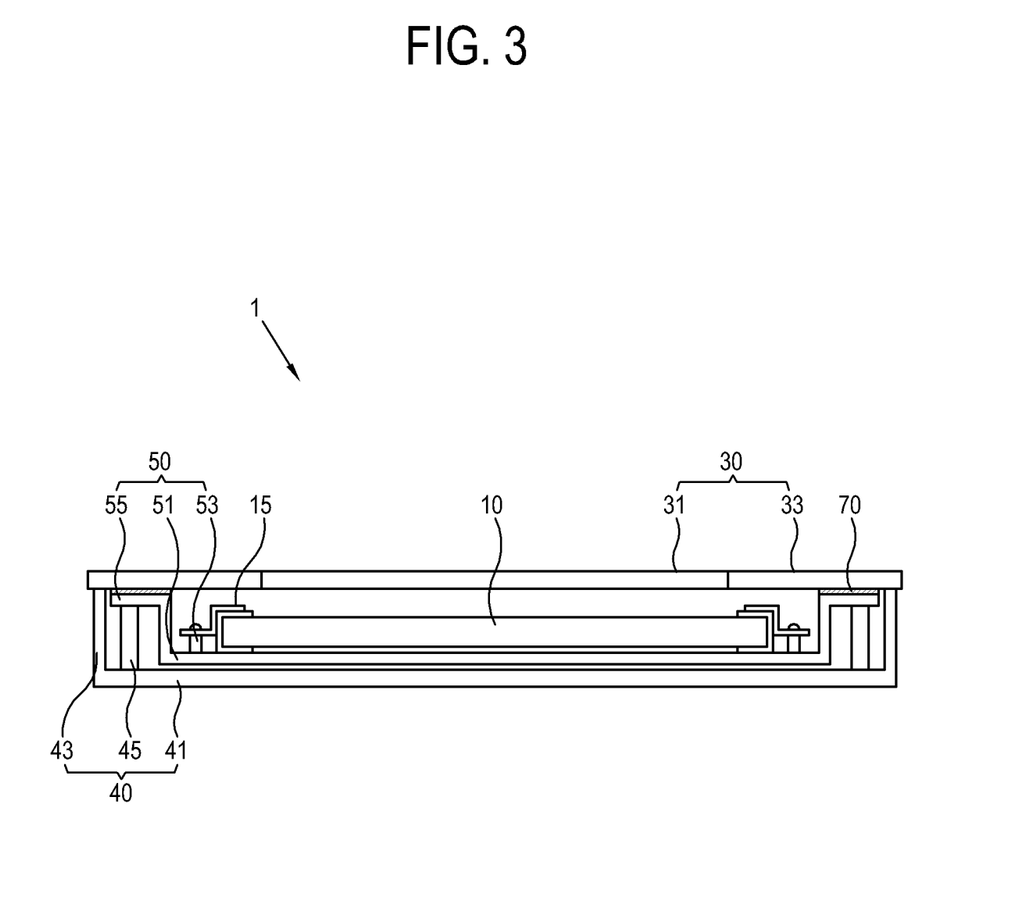
FIG. 3 is a sectional view of the display apparatus of FIG. 1.

As shown in FIGS. 1 to 3, display apparatus 1 includes a display module 10 for forming an image, a window cover 30 provided on an upper side of the display module 10, a base cover 40 provided on a lower side of the display module 10 and a middle member 50 provided between the display module 10 and the base cover 40 to couple the display module 10 and the base cover 40.

The display apparatus 1 are intended to be used in various electronic device types including without limitation a monitor, an electronic frame, a television, etc., and are readily powered by known electric power supplying apparatus (not shown), for example, a battery where the electronic device comprising the display apparatus is intended to be portable.

The display module 10 includes a panel unit 11 for forming an image and a sash unit 13 arranged about a circumference of the panel unit 11 to integrally support the display module 10. The display module 10 further includes a backlight unit (not shown) provided to a rear of the panel unit 11 and a driving circuit unit (not shown) for driving the display module 10. The display module 10 is shown coupled to the middle member 50 by a module bracket 15.

While the panel unit 11 is shown to include a liquid crystal display (LCD) panel, the invention is not limited thereto. That is, the invention may comprise a display panel of a thin plate shape of various types, such as a plasma display panel (PDP), an organic light emitting diode (OLED), etc., without deviating from the scope and spirit of the invention. And while the backlight unit exemplarily employs a light emitting diode (LED), the backlight unit is not limited thereto but may employ a light source of various types including without limitation a fluorescent lamp, etc.

The module bracket 15 is provided in plural to couple the display module 10 to the middle member 50. The module bracket 15 is formed of a metal material having an elastic property. The module bracket 15, is not limited to being formed from a metal, but may be formed of various materials that display an elastic property, such as plastic, etc., without deviating from the scope of spirit of the invention. As shown, a side of the module bracket 15 supports an upper side of the sash unit 13. Another side of the module bracket 15 is coupled to the middle member 50 by a screw 58, etc. However, the module bracket 15 is not limited to the exemplary embodiment shown, and may be realized in various known bracket forms such as an elastic hook, etc., mounted to the middle member 50, without deviating from the scope and spirit of the invention.

The window cover 30 is provided in a planar shape to a front of the display module 10. The window cover 30 is formed of a transparent material that allows penetration of an image formed in or by the panel unit 11 of the display module 10. The window cover 30 includes a window unit 31 formed of a transparent material to correspond to the panel unit 11 and a bezel coupling unit 33. The bezel coupling unit is arranged about a circumference of the window unit 31 for coupling to a bezel unit 55 of the middle member 50. In an embodiment, the window unit 31 of the window cover 30 uses a glass material having a high strength that is not readily damaged by an external impact. The exemplary window cover, however, is not limited to glass only but may be formed of various known materials such as a transparent plastic material, etc., without deviating from the scope and spirit of the invention.

In an embodiment, the bezel coupling unit 33 is formed of the same material as the window unit 31 and is coated in black for aesthetic purposes and to prevent the bezel unit 55 from being exposed. However, the bezel coupling unit 33 is not limited thereto and may be formed of material different from the window unit 31, or may be coated in various colors such as blue, red, white, etc., instead of black, without deviating from the scope and spirit of the invention. In more detail, the bezel coupling unit 33 may be formed various materials such as a glass material, a plastic material, a metal material, without limitation in order that it be different in composition from the window unit 31.

The base cover 40 is provided at a rear of the middle member 50 in order to cover a rear surface of the middle member 50. In the embodiment shown, the base cover 40 is formed of a plastic material. The base cover 40, however, may be formed of various materials such as a metal material, etc., without deviating from the scope and spirit of the invention.

The base cover 40 includes a middle member accommodating unit 41 for accommodating and supporting the middle member 50 and a skirt unit 43 upwardly protruding from a circumference of the middle member accommodating unit 41. In the embodiment shown, a plurality of middle member coupling units 45 are provided with the middle member accommodating unit 41 in order to couple with the middle member 50.

In the embodiment shown, the middle member coupling unit 45 is provided with a pem nut type so that the screw 58 passing through a base cover coupling unit 57 of the middle member 50 can couple. The middle member coupling unit 45, however, is not limited thereto and may be formed in various shapes such as a boss type formed with a female screw, etc., without deviating from the scope and spirit of the invention. Also, the middle member 50 of the base cover 40 is not limited to the screw coupling, as shown but may be coupled by welding a part of the components to be coupled, coupled by use of various other known coupling means, such as an elastic hook, etc., without deviating from the scope and spirit of the invention.

The middle member 50 includes a module support unit 51 for supporting the display module 10 and the bezel unit 55 extending about a circumference of the module support unit 51 in order to couple with the window cover 30.

In the embodiment shown, the module support unit 51 is a planar type. That is, the module support unit 51 is inserted between the display module 10 and the base cover 40 to divide an area in which the display module 10 is arranged from the base cover 40. Accordingly, moisture permeating in a direction of the base cover 40 is prevented from seeping through to an area in which the display module 10 is so arranged. Also, the module support unit 51 is formed in a space between the base cover 40 and the middle member 50, such an arrangement reduces forces impacting the base cover 40 from being transmitted to the display module 10.

A module coupling unit 53 is included to couple the display module 10 to a surface of the module support unit 51.

In the embodiment shown, the module coupling unit 53 comprises a pem nut type to couple the other side of the module bracket 15 by complementary use of a screw 58. The module coupling unit 53, however, is not limited thereto, but may be provided in various types such as a boss type formed with a female screw, etc., without deviating from the scope and spirit of the invention.

The bezel unit 55 is coupled to the window cover 30 by an adhering member 70. The bezel unit 55 protrudes from the module support unit 51 so that display module 10 can be adapted or form fitted to the module support unit 51. An upper surface of the bezel unit 55 has a predetermined width to facilitate contact to the window cover 30 by the adhering member 70. In the embodiment shown, the predetermined width of the bezel unit 55 is preferable in a range of between 5 mm and 10 mm, but is not limited thereto and may be 3 mm or less, as required. That is, the predetermined width of the bezel unit 55 is configured to enable waterproof performance and to realize an adhering force by the adhering member 70.

In the embodiment shown, the adhering member 70 may comprise a double sided tape having a waterproof function. For example, the adhering member 70 in a form of a double sided tape may comprise an acryl adhesive, etc., applied to the opposite side of a flexible material. The adhering member 70, however, is not limited to acryl adhesive, but may be realized by applying various known adhesives to the opposite sides of various materials without deviating from the scope and spirit of the invention.

For that matter, the adhering member 70 is not limited to the double sided tape but may be realized by various types such as any known adhesive, etc., without deviating from the scope and spirit of the invention. Accordingly, coupling the window cover 30 and the bezel unit 55 of the middle member 50 using the adhering member 70 with waterproof function, moisture is prevented from seeping through an area in which the display module 10 is adapted through the window cover 30 and the middle member 50.

The display apparatus 1 includes a manipulating button 80 for manipulating the display apparatus 1 to function as a monitor, an electronic frame, a television, etc. In the embodiment shown, the manipulating button 80 is provided in plural to a side of the display apparatus 1, as shown (see FIG. 2). The manipulating button 80 is formed to protrude from the skirt unit 43 of the base cover 40. The manipulating button 80, however, is not limited thereto but may be arranged at various positions, for example, on a front surface of the display apparatus 1, etc., without deviating from the scope and spirit of the invention. In one embodiment, the manipulating button 80 is covered with a vinyl material, etc., in order to prevent moisture from permeating through a gap between the manipulating button 80 and the skirt unit 43.

In the embodiment shown, the base cover coupling unit 57 is provided to the bezel unit 55 for coupling with the base cover 40. For example, the base cover coupling unit 57 may be coupled to the middle member coupling unit 45 of the base cover 40 by use of screw 58.

One embodiment of a process of assembling a display apparatus 1 of the invention now will be described.

At first, the middle member 50 is coupled to the base cover 40 by using the screw 58. That is, the base cover coupling unit 57 of the middle member 50 and the middle member coupling unit 45 of the base cover 40 are coupled using screw 58.

Then, the display module 10 is adapted or form fitted to the module support unit 51 of the middle member 50. Then, the display module 10 is coupled to the middle member 50 using the module bracket 15 and screw 58. Adhering member 70 is then attached to the bezel unit 55 of the middle member 50. Thereafter, the window cover 30 is adhered to an upper surface of the bezel unit 55, thereby easily coupling the window cover 30 to the bezel unit 55. Such assembly readily prevents permeation of moisture by use of the adhering member 70, which displays or implements the waterproof function.

In the embodiment shown, a screw coupling hole 35 is formed in the window cover 30 to correspond to the base cover coupling unit 57 of the middle member 50. That is, where the screw coupling hole 35 is formed in the window cover 30, screw 58 can pass through the screw coupling hole 35 and the base cover coupling unit 57 of the middle member 50 thereby coupling same to the middle member coupling unit 45 of the base cover 40. But if the screw coupling hole 35 is not formed in the window cover 30, the screw 58 passes through the base cover coupling unit 57 of the middle member 50 to couple the middle member coupling unit 45 of the base cover 40.

Accordingly, the display apparatus 1 operates such that the middle member 50 easily prevents moisture permeating in the direction of the base cover 40 from seeping into an area where the display module 10 is so adapted. Also, since a space is formed between the base cover 40 and the middle member 50, transmission of an impact to the base cover 40 through to the display module 10 is reduced.

In addition, where the display apparatus 1 uses adhering member 30 with waterproof function to couple the window cover 30 and the bezel unit 55 of the middle member 50, not only is moisture prevented from permeating into an area in which the display module 10 is so adapted between the window cover 30 and the middle member 50, but assembling such a display module is made very easy.

Figure 4:
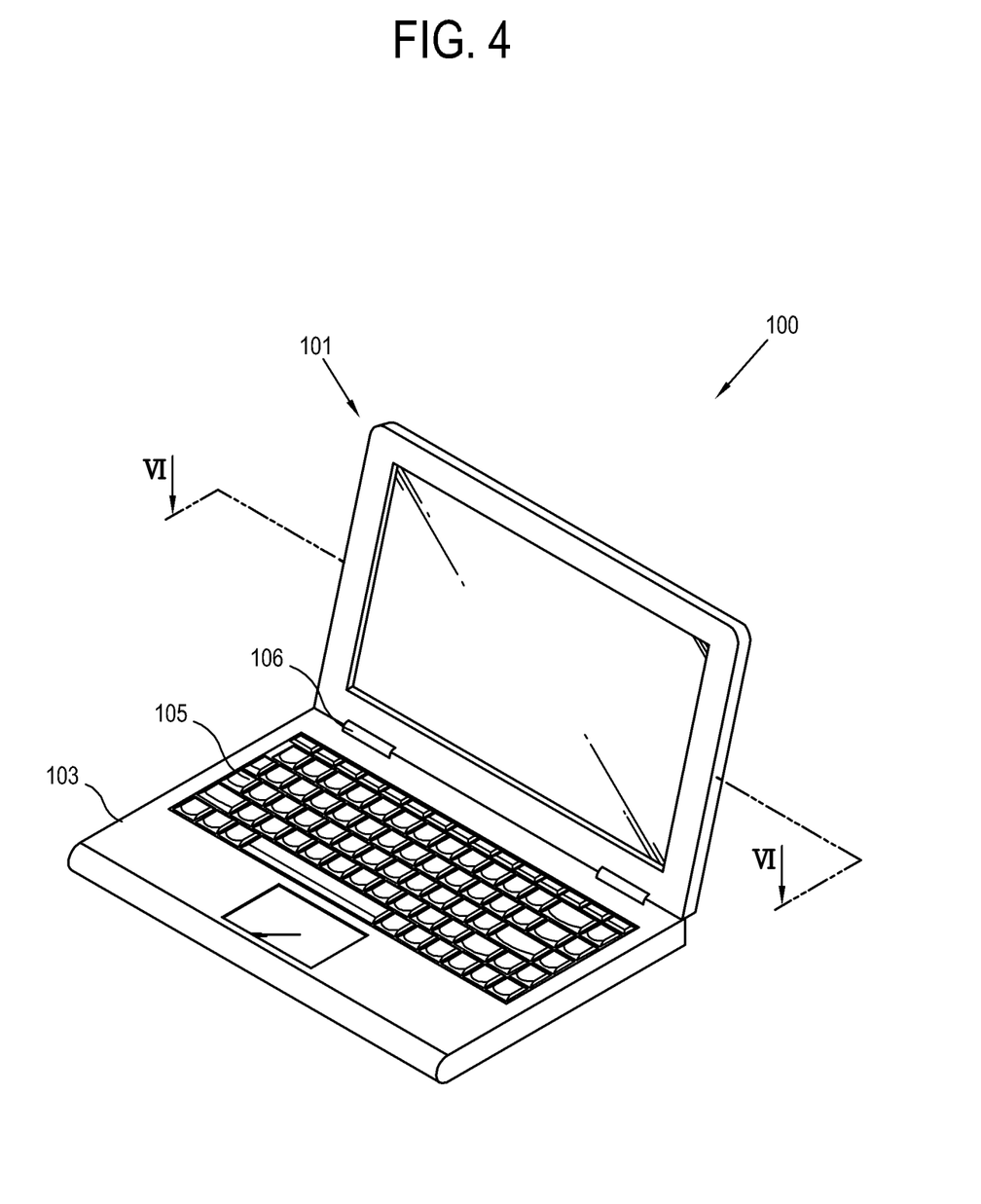
FIG. 4 is a perspective view of a portable computer according to another exemplary embodiment.
Figure 5:
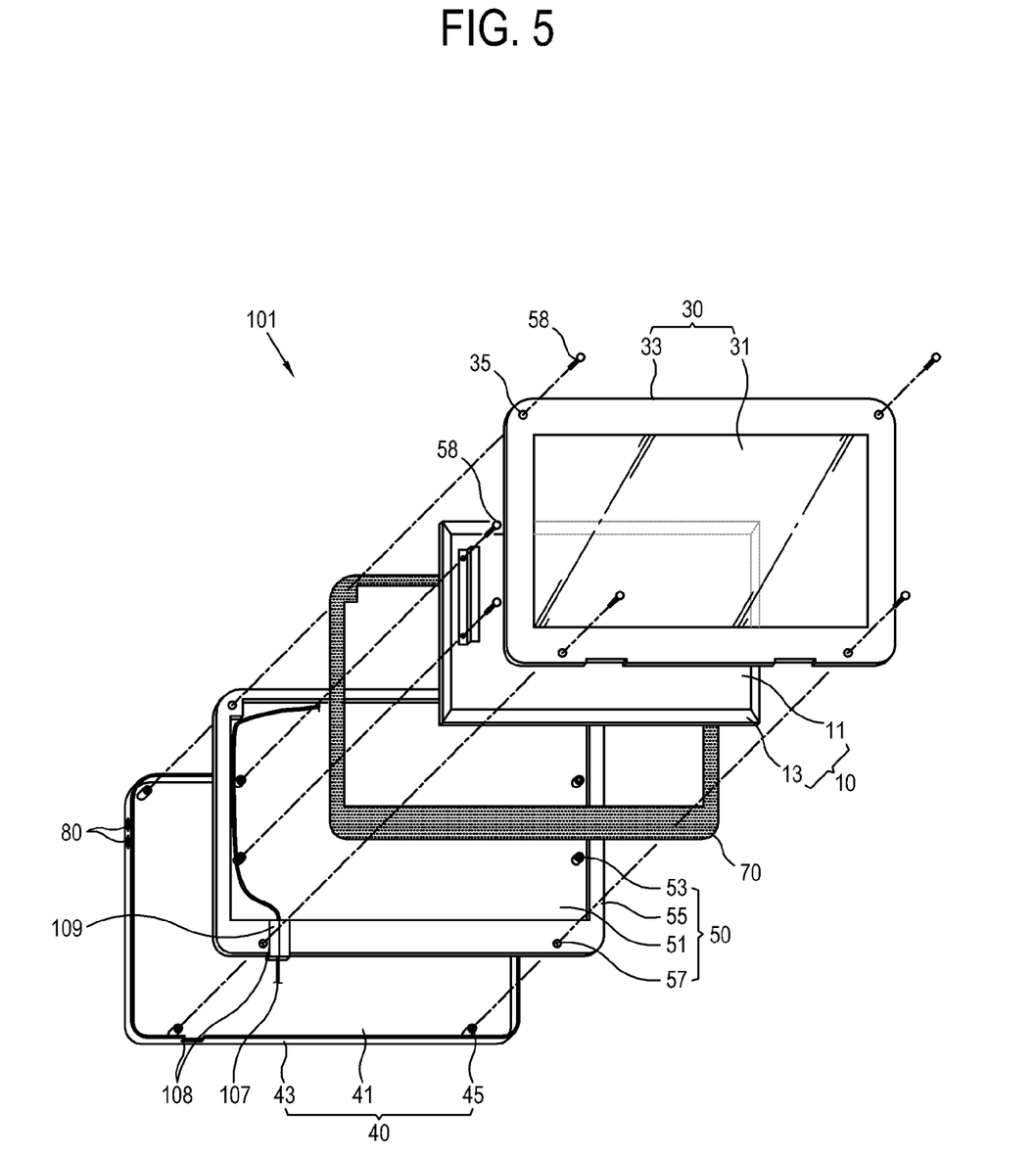
FIG. 5 is an exploded partial view of the portable computer of FIG. 4.
Figure 6:
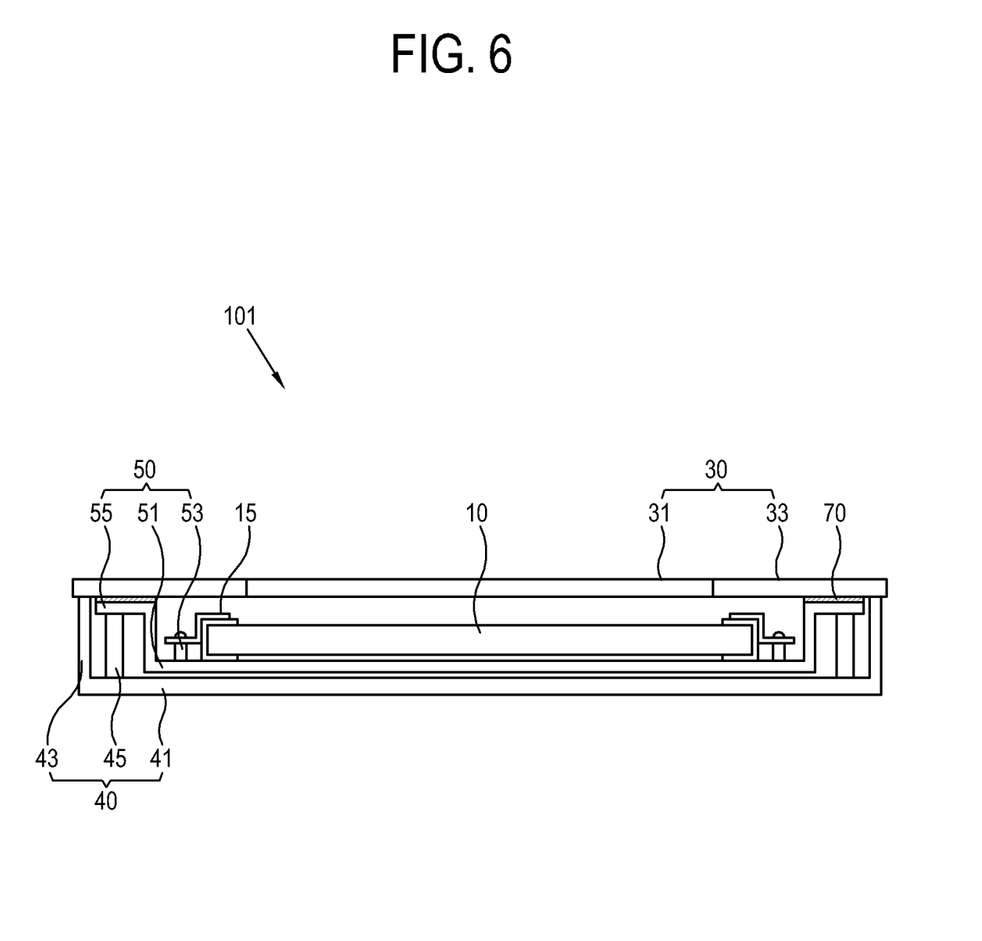
FIG. 6 is a sectional view of the portable computer of FIG. 4.

FIG. 4 is a perspective view of a portable computer according to an embodiment of the invention, FIG. 5 is an exploded partial view of the portable computer of FIG. 4 and FIG. 6 is a sectional view of the portable computer of FIG. 4.

As shown therein, portable computer 100 includes a computer main body 103 and a display apparatus 101 rotatably mounted with respect to the computer main body 103.

The computer main body 103 includes electronic components such as a central processing unit (CPU) and a memory device mounted inside as well as an input device such as a keyboard 105. The computer main body 103 is coupled to the display apparatus 101 using a hinge unit 106 to allow for rotatable movement of the display apparatus 101 about the computer main body via the hinge unit.

The display apparatus 101 as shown is substantially equivalent to display apparatus 1, and is constructed and operates as described above. But while the display apparatus 1 as described above is constructed with the manipulating button 80, etc., to operate independently as a monitor, an electronic frame, a television, etc., display apparatus 101 is rotatably coupled with the computer main body 103 by the hinge unit 106 and connected electrically or electronically with the computer main body 103 by a cable 107 to transmit and receive an electric signal therewith. In the embodiment shown, the cable 107 extends to the outside through the bezel unit 55 of the middle member 50 and a penetrating unit 108 of the skirt unit 43 of the base cover 40. A cable sealing member 109 is included in the penetrating unit 108 to prevent moisture from permeating.

For example, the cable sealing member 109 may be formed of material having an elastic force such as a rubber, a silicon, etc.

The configuration illustrated in FIGS. 4 to 6 is substantially equivalent to the configuration of the display apparatus 101, as previously described, so the detailed description thereof is omitted.

Accordingly, the portable computer 100 includes the middle member 50 to readily prevent moisture permeating in the direction of the base cover 40 from seeping into an area in which the display module 10 is so adapted or form fitted. Also, a space formed between the base cover 40 and the middle member 50 acts to reduce impact forces transmitted to the base cover 40 to the display module 10.

In addition, where the portable computer 100 couples the window cover 30 and the bezel unit 55 of the middle member 50 by use of adhering member 70 and its waterproof function, not only is moisture prevented from permeating into an area between the window cover 30 and the middle member 50, but assembling such a display module is made very easy.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:
1. A display apparatus, comprising:
a display module configured to display an image;
a window cover configured to cover an upper side of the display module;

a base cover configured to cover a lower side of the display module and having a first hole;

a middle member disposed between the display module and the base cover, the middle member comprising a module support unit configured to form an area for accommodating the display module and having a second hole, and a bezel unit arranged on periphery of the module support unit to contact with an edge of the window cover;

an adhering member interposed between the bezel unit and the window cover to couple and continuously seal therebetween, and having a waterproof function so that humidity penetrating from an exterior of the display apparatus to the area for accommodating the display module is prevented, the adhering member being formed of a double sided tape or an adhesive;

a cable extended from the display module through the first hole and the second hole, and configured to electrically connect the display module and a computer exterior of the display apparatus; and a cable sealing member disposed on at least one of the first hole and the second hole to prevent humidity from penetrating, the cable sealing member being formed of a material having an elastic force.

2. The display apparatus according to claim 1, wherein the module support unit is configured as a planar shape.

3. The display apparatus according to claim 1, wherein the bezel unit protrudes from the module support unit so that the display module is affixed to the module support unit.

4. A portable computer, comprising:
a computer main body; and
a display apparatus mounted on the computer main body for rotational movement with respect to the computer main body, wherein the display apparatus comprises:
a display module configured to display an image;
a window cover configured to cover an upper side of the display module;
a base cover configured to cover a lower side of the display module and having a first hole;
a middle member disposed between the display module and the base cover, the middle member comprising a module support unit configured to form an area for accommodating the display module and having a second hole, and a bezel unit arranged on periphery of the module support unit to contact with edge of the window cover;
an adhering member interposed between the bezel unit and the window cover to couple and continuously seal therebetween, and having a waterproof function so that humidity penetrating from an exterior of the display apparatus to the area for accommodating the display module is prevented, the adhering member being formed of a double sided tape or an adhesive;

a cable extended from the display module through the first hole and the second hole, and configured to electrically connect the display module and the computer main body; and a cable sealing member disposed on at least one of the first hole and the second hole to prevent humidity from penetrating, the cable sealing member being formed of a material having an elastic force.

5. The portable computer according to claim 4, wherein the module support unit is configured as a planar shape.

6. The portable computer according to claim 4, wherein the bezel unit protrudes from the module support unit so that the display module is affixed to the module support unit.

7. The display apparatus according to claim 1, wherein the display module comprises a panel unit for forming the image and a sash unit around a circumference of the panel unit.

8. The display apparatus according to claim 7, wherein the module supporting unit comprises a module bracket for supporting an upper side of the sash unit at one end.

9. The display apparatus according to claim 8, wherein another side of the module bracket is coupled to the middle member by a screw.

10. The portable computer according to claim 4, wherein the display module comprises a panel unit for displaying the image and a sash unit around a circumference of the panel unit.

11. The portable computer according to claim 10, wherein the module supporting unit comprises a module bracket for supporting an upper side of the sash unit at one end.

12. The portable computer according to claim 11, wherein another side of the module bracket is coupled to the middle member by a screw.

13. The display apparatus according to claim 1, wherein a space is formed between the base cover and the middle member so that a transmission of an impact to the base cover through to the display module is reduced.

14. The portable computer according to claim 4, wherein a space is formed between the base cover and the middle member so that a transmission of an impact to the base cover through to the display module is reduced.

15. The display apparatus according to claim 1, further comprising at least one manipulation button configured to manipulate the display apparatus and formed to protrude from the base cover, wherein the at least one manipulation button is covered with sealing material to prevent humidity from penetrating through a gap between the manipulation button and the base cover.

16. The portable computer according to claim 4, wherein the display apparatus further comprises at least one manipulation button configured to manipulate the display apparatus and forme to protruded from the base cover, wherein the at least one manipulation button is covered with sealing material to prevent humidity from penetrating through a gap between the manipulation button and the base cover.

* * * * *

UNITED STATES PATENT AND TRADEMARK OFFICE
CERTIFICATE OF CORRECTION

| | | |
|---|---|---|
| PATENT NO. | : 8,767,384 B2 | Page 1 of 1 |
| APPLICATION NO. | : 12/856831 | |
| DATED | : July 1, 2014 | |
| INVENTOR(S) | : Young-Shin Song | |

It is certified that error appears in the above-identified patent and that said Letters Patent is hereby corrected as shown below:

In the Claims

Column 7, Claim 1, Line 22 should read as follows:
--...a cable sealing member...--

Column 7, Claim 4, Line 46 should read as follows:
--...with an edge of...--

Column 7, Claim 4, Line 54 should read as follows:
--...tape or an adhesive;...--

Signed and Sealed this
Twenty-third Day of September, 2014

Michelle K. Lee
*Deputy Director of the United States Patent and Trademark Office*